(12) United States Patent
Tanaka

(10) Patent No.: US 8,306,693 B2
(45) Date of Patent: Nov. 6, 2012

(54) INPUT SYSTEM FOR VEHICLE

(75) Inventor: Tsuyoshi Tanaka, Kyoto (JP)

(73) Assignee: Panasonic Corporation, Osaka (JP)

( * ) Notice: Subject to any disclaimer, the term of this patent is extended or adjusted under 35 U.S.C. 154(b) by 347 days.

(21) Appl. No.: 12/699,306

(22) Filed: Feb. 3, 2010

(65) Prior Publication Data

US 2010/0204884 A1 Aug. 12, 2010

(30) Foreign Application Priority Data

Feb. 6, 2009 (JP) ................................. 2009-025731

(51) Int. Cl.
*G06F 7/00* (2006.01)
(52) U.S. Cl. .............. 701/36; 701/42; 701/65; 701/103; 701/104; 701/419; 345/104; 345/173; 345/179; 345/443; 382/167; 715/203; 715/255; 715/856; 386/340; 600/15
(58) Field of Classification Search .................... 701/29, 701/30, 34, 35, 36, 42, 65, 103, 104, 419; 345/104, 173, 179, 443; 358/518; 382/167; 715/203, 255, 856; 386/27, 37, 340, 569; 600/15
See application file for complete search history.

(56) References Cited

U.S. PATENT DOCUMENTS

| | | | | |
|---|---|---|---|---|
| 5,961,570 A | * | 10/1999 | Inamori | 701/538 |
| 6,434,450 B1 | * | 8/2002 | Griffin et al. | 701/1 |
| 7,310,084 B2 | | 12/2007 | Shitanaka et al. | |
| 7,379,541 B2 | * | 5/2008 | Iggulden et al. | 379/102.03 |
| 7,714,800 B2 | * | 5/2010 | Kobayashi | 345/1.1 |

FOREIGN PATENT DOCUMENTS

JP 2006-012695 A 1/2006
* cited by examiner

*Primary Examiner* — James Trammell
*Assistant Examiner* — McDieunel Marc
(74) *Attorney, Agent, or Firm* — RatnerPrestia

(57) ABSTRACT

An input system for vehicle includes an actuator operable by an operator, a controller outputting a display signal in response to an operation on the actuator, and a display to display an image based on the display signals. The controller outputs a control signal to a target device that performs one or more functions. The image includes a graphic object indicating the actuator, one or more arrows located around the graphic object, and one or more function indicators located in one or more directions indicated by the one or more arrows, respectively. The one or more function indicators indicate the one or more functions, respectively. The controller is operable to, upon the operator operating the actuator in the direction corresponding to an arrow out of the one or more arrows, select a function indicator out of the one or more function indicators located in a direction indicated by the arrow, and to control the target device to perform a function out of the one or more functions indicated by the selected function indicator. The operator can operate the input system reliably.

4 Claims, 9 Drawing Sheets

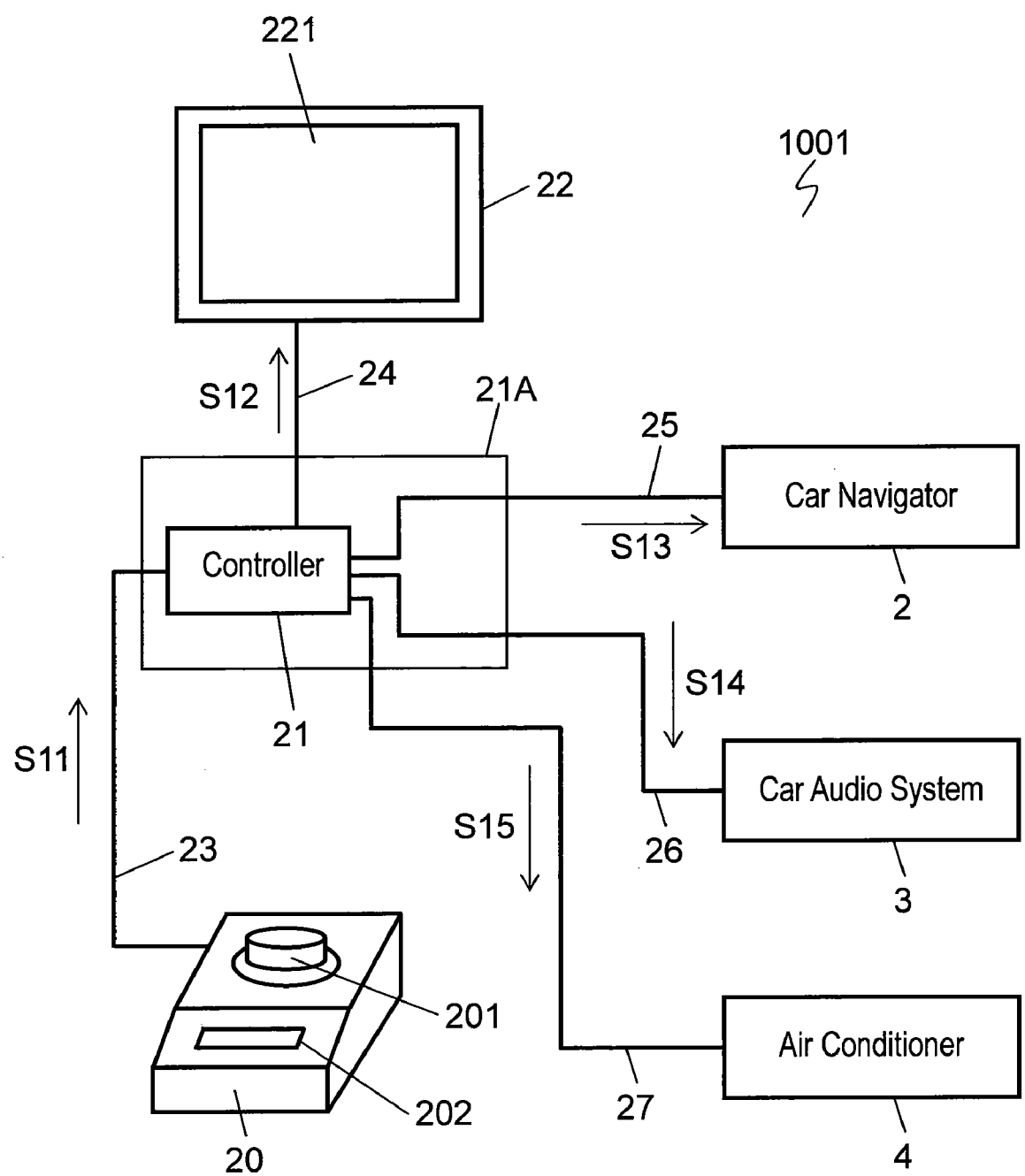

INPUT SYSTEM FOR VEHICLE

FIELD OF THE INVENTION

The present invention relates to an input system for vehicle used to operate electronic devices, such as a car audio system, an air conditioner and a car navigator, installed in a vehicle.

BACKGROUND OF THE INVENTION

Input systems for vehicle including a display, such as an LCD, have been recently used to operate various electronic devices, such as a car audio system, an air conditioner and a car navigator that are installed in a vehicle. The input systems include a display mounted to a front panel of a car cabin, a controller to display plural function indicators on the display, and an input unit with an actuator. Operating the actuator, an operator selects one from the displayed function indicators.

FIG. 8 is a schematic view of conventional input system 1 for vehicle. Display 11 has a screen implemented by a display element, such as an LCD. Input unit 12 including actuator 12A capable of sliding from side to side or up and down and is mounted on upper right of display 11. Plural triangle marks are printed on the surface of actuator 12A and indicate outward directions of right to left or up and down by each triangle's top. Controller 13 includes semiconductor components, such as a microcomputer, and is mounted on a printed circuit board together with electronic components, such as fixed resistors and capacitors. Upon receiving operation signal S1 from input unit 12, controller 13 outputs display signal S2 to display 11. Display 11, input unit 12, and controller 13 are accommodated together in a single case, thus providing input system 1 for vehicle.

Input system 1 for vehicle is mounted in the center of front panel in a car cabin. Car navigator 2, car audio system 3, and air conditioner 4 are accommodated in the car cabin. Controller 13 is connected to car navigator 2, car audio system 3, and air conditioner 4 via connectors or cables 5 to 7, and sends control signals S3, S4 and S5 to car navigator 2, car audio system 3, and air conditioner 4, respectively.

Upon input system 1 being turned on, controller 13 sends display signal S2 to display 11 to display an image on the screen. FIG. 9 illustrates the image. The image includes map 11A and plural function indicators 11B to 11D. Map 11A is shown generally in the center of the screen of display 11. Plural function indicators 11B to 11D are shown below map 11A.

While map 11A is displayed on display 11, an operator has a hand stretched and pinches actuator 12A with fingers to slide actuator 12A while looking at input unit 12.

Looking at input unit 11 again, the operator can recognize that map 11A is scrolled from the current map as to display a map of a direction corresponding to the direction in which actuator 12A is slid.

The operator looks at input unit 12 subsequently and has a hand stretched to press down actuator 12A with a finger. Detecting this pressing, controller 13 switches function indicators 11B to 11D shown on display 11.

For instance, when the operator presses down actuator 12A once, controller 13 selects function indicator 11B out of function indicators 11B to 11D. Next, when the operator slides actuator 12A upward, controller 13 sends control signal S4 to the car audio system to increase volume.

However, since the conventional input system 1 for vehicle had only a function to display map 11A and function indicators 11B to 11D. Therefore, the operator operates input system 1 while looking at input unit 12 being operated, looking at map 11A on display 11, or looking at both display 11 and input unit 12 simultaneously, thus being prevented from operating the input system reliably.

SUMMARY OF THE INVENTION

An input system for vehicle includes an actuator operable by an operator, a controller outputting a display signal in response to an operation on the actuator, and a display to display an image based on the display signals. The controller outputs a control signal to a target device that performs one or more functions. The image includes a graphic object indicating the actuator, one or more arrows located around the graphic object, and one or more function indicators located in one or more directions indicated by the one or more arrows, respectively. The one or more function indicators indicate the one or more functions, respectively. The controller is operable to, upon the operator operating the actuator in the direction corresponding to an arrow out of the one or more arrows, select a function indicator out of the one or more function indicators located in a direction indicated by the arrow, and to control the target device to perform a function out of the one or more functions indicated by the selected function indicator.

The operator can operate the input system reliably.

BRIEF DESCRIPTION OF THE DRAWINGS

FIG. 1A is a schematic view of an input system for vehicle in accordance with an exemplary embodiment of the present invention.

DETAILED DESCRIPTION OF PREFERRED EMBODIMENT

Figure 1B:
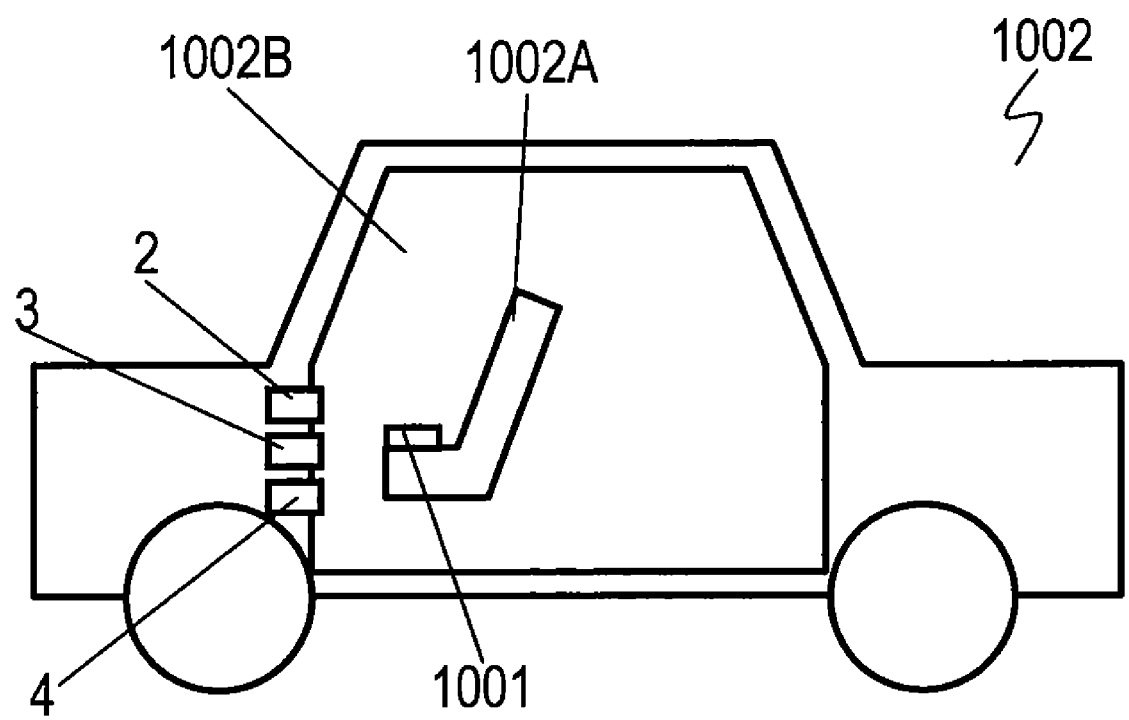
FIG. 1B is a schematic view of a vehicle having the input system mounted thereto in accordance with the embodiment.

FIG. 1A is a schematic view of input system 1001 for vehicle in accordance with an exemplary embodiment of the present invention. FIG. 1B is a schematic view of vehicle 1002 having input system 1001 mounted thereto. Actuator 201 arranged to be operated by an operator is provided on an upper surface of input unit 20. Push button 202 is provided on the upper surface of input unit 20 and in front of actuator 201. Actuator 201 is made of metal, such as aluminum, or resin and has substantially a semi-spherical shape. Actuator 201 is located on a position allowing the operator to easily operate actuator 201 while sitting on driver seat 1002A of vehicle 1002. The operator operates actuator 201 by sliding or tilting the actuator back and forth or from side to side or rotating the actuator clockwise or counter-clockwise while placing fingers or a palm on the upper part of the actuator.

Controller 21 including semi-conductor components, such as microcomputers, is mounted on a printed circuit board together with fixed resistors and capacitors, and is accommodated in case 21A made of metal, such as aluminum, or resin. Controller 21 is connected to input unit 20 via connectors or cables to send operation signals S11 from input unit 20 to controller 21.

Display 22 including a display element, such as an LCD, has a screen 221 on a front surface thereof. Display 22 is connected to controller 21 via connectors or cables 24 to receive display signals S12 from controller 21.

Input unit 20 is placed at a position, such as a location a driver seat and a passenger seat or an armrest, which the operator sitting on the driver seat can reach easily by stretching fingers or a palm. Case 21A accommodating therein controller 21 is fixed inside an instrument panel of a vehicle with, e.g. a screw. Display 22 is mounted in the center of the front panel of car cabin 1002B of vehicle 1002.

Controller 21 is connected to a target device, such as car navigator 2, car audio system 3, and air conditioner 4, which is installed in the car cabin and to which control signals S13, S14 and S15 are sent, respectively.

An operation of input system 1001 for vehicle will be described below. FIGS. 2, 3, 4A, 4B, 5A, 5B, 6, 7A and 7B illustrate images displayed on screen 221 of display 22.

Figure 2:
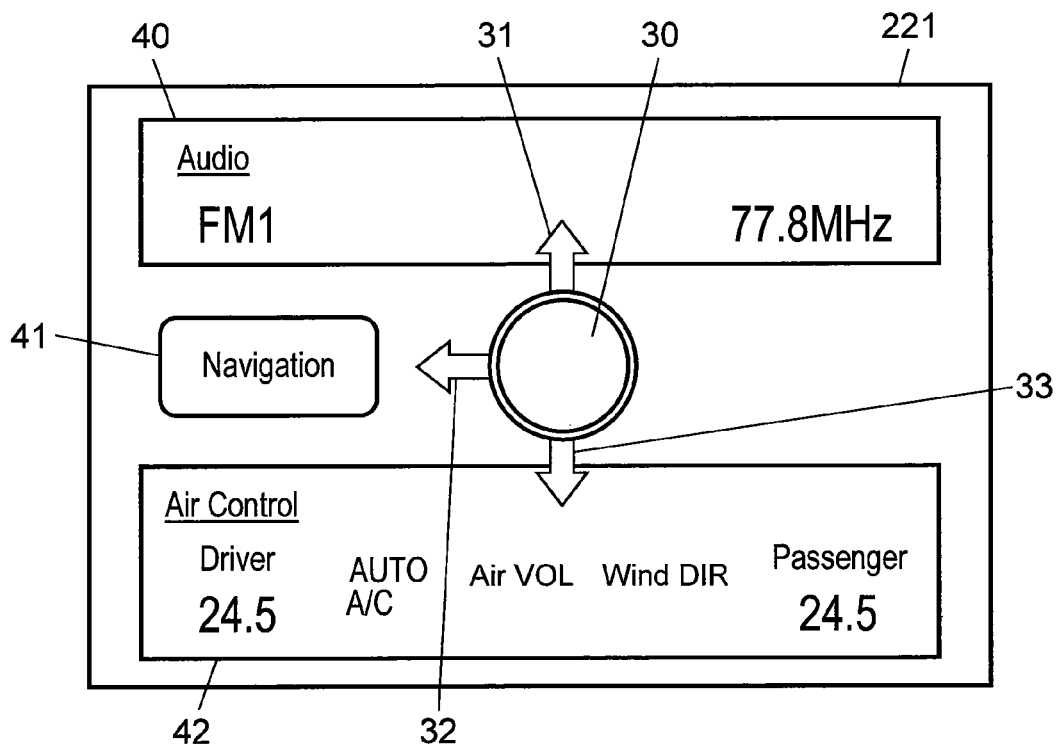
FIGS. 2 and 3 illustrate images displayed on a screen of the input system in accordance with the embodiment.

Upon controller 21 and display 22 being turned on, controller 21 activates the target device, such as car navigator 2, car audio system 3, and air conditioner 4 to allow the target device to be controllable and displays an initial image shown in FIG. 2 on screen 221 of display 22 according to display signal S12 from controller 21.

The initial image shown in FIG. 2 includes graphic object 30 located substantially at the center of screen 221, upwards arrow 31, leftwards arrow 32, downwards arrow 33, and function indicators 40 to 42 located outside arrows 31 to 33, respectively. Arrows 31 to 33 are located around graphic object 30. Upwards arrow 31 is located above graphic object 30 and directs an upward direction from graphic object 30. Leftwards arrow 32 is located at a left side of graphic object 30 and directs a leftward direction from graphic object 30. Downwards arrow 33 is located below graphic object 30 and directs a downward direction from graphic object 30. Function indicator 40 is located above upwards arrow 31 which is directed by upwards arrow 31. Function indicator 41 is located at a left side of leftwards arrow 32 which is directed by leftwards arrow 32.

Graphic object 30 displayed on screen 221 includes a concentric double-circle, and indicates actuator 201 of input unit 20, thus having a shape suggesting actuator 201 to the operator. Arrows 31 to 33 indicate possible directions in which the operator to operate actuator 201.

Function indicator 40 surrounded by a rectangular frame indicates car audio system 3 to display a tuned frequency and a channel number. Function indicator 41 indicates car navigator 2 to display a map and a guide for driving destination. Function indicator 42 indicates air conditioner 4 to display a temperature setting.

Upon the operator tilting or moving actuator 201 of input unit 20 in a backward direction corresponding to downwards arrow 33 with a hand or fingers, controller 21 outputs display signal S12 to display 22 in response to operation signal S11 sent from input unit 20. Display 22 then displays an image relating to a function corresponding to function indicator 42 located in the direction indicated by downwards arrow 33 on screen 221 in response to display signal S12.

Figure 3:
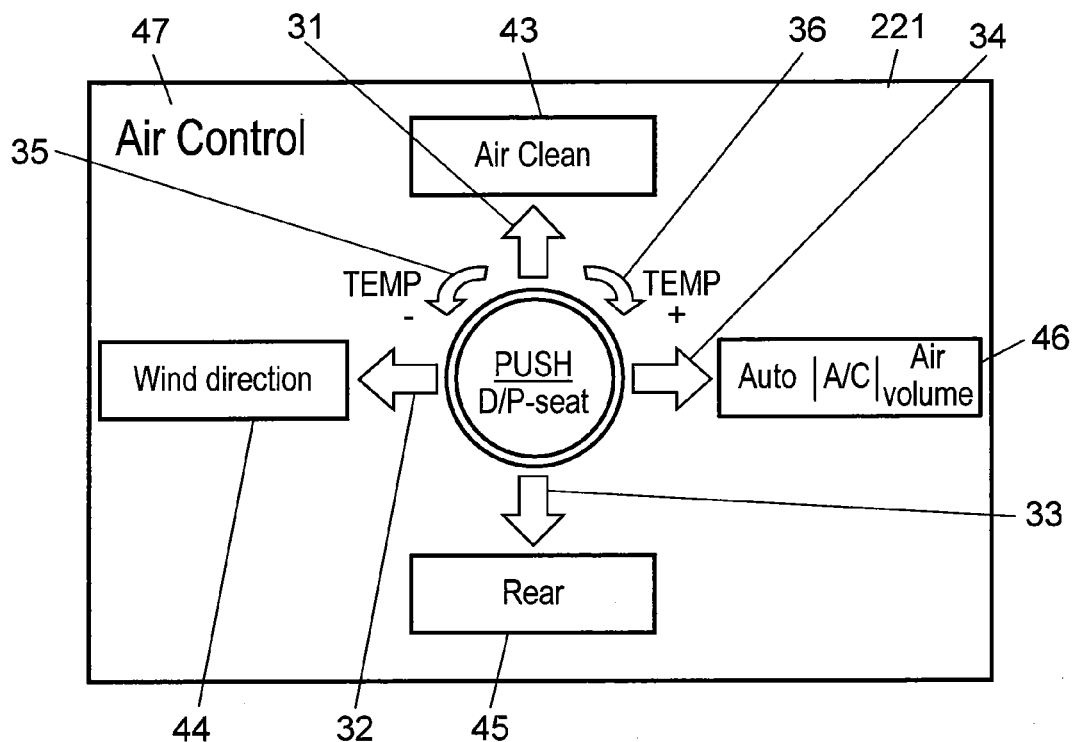

FIG. 3 illustrates an image relating to a function of function indicator 42. This image shown in FIG. 3 is for setting air conditioner 4. Character string 47, "AIR CONTROL", located at upper left shows that the image is for setting air conditioner 4.

The image includes: graphic object 30 located at the center of screen 221, upwards arrow 31, leftwards arrow 32, downwards arrow 33, rightwards arrow 34, anti-clockwise arrow 35, clockwise arrow 36, and function indicators 43 to 46 located outside arrows 31 to 34, respectively. Arrows 31 to 36 are located around graphic object 30. Upwards arrow 31 is located above graphic object 30 and directs an upward direction. Leftwards arrow 32 is located at a left side from graphic object 30 and directs a leftward direction. Downwards arrow 33 is located below graphic object 30 and directs a downward direction. Rightwards arrow 34 is located at a right side from graphic object 30 and directs a rightward direction. Counterclockwise arrow 35 is located between upwards arrow 31 and leftwards arrow 32 and directs a direction from upwards arrow 31 to leftwards arrow 32. Clockwise arrow 36 is located between upwards arrow 31 and rightwards arrow 34 and directs a direction from upwards arrow 31 to rightwards arrow 34.

Function indicator 43 located above upwards arrow 31 relates to air cleaning, and includes a character string "Air Clean". Function indicator 46 located at the right side of rightwards arrow 34 relates to air conditioning for the front side of the vehicle performed by air conditioner 4, and includes a character string "Auto|A/C|Air Volume". Function indicator 45 located below downwards arrow 33 relates to air conditioning for the rear side of the vehicle performed by air conditioner 4, and includes a character string, "Rear". Function indicator 44 located at the left side of leftwards arrow 32 relates to the wind direction of air conditioner 4, and includes a character display string, "Wind direction".

Upon the operator tilting actuator 201 of input unit 20 in a direction out of the directions indicated by arrows 31 to 34, controller 21 outputs display signal S12 in response to operation signal S11 sent from input unit 20, and selects a function indicator out of function indicators 43 to 46 indicated by the arrow indicated by the direction in which actuator 201 is tilted.

The image shown in FIG. 3 further includes character strings, "TEMP" and "+" located near the head of clockwise arrow 36, and character strings "TEMP" and "−" located near the head of counterclockwise arrow 35. Upon the operator rotating actuator 201 in a clockwise direction corresponding to clockwise arrow 36, controller 21 controls air conditioner 4 to raise a setting temperature at the driver seat and the passenger seat. Upon the operator rotating actuator 201 in a counterclockwise direction corresponding to counterclockwise arrow 35, controller 21 controls air conditioner 4 to lower the setting temperature.

The image shown in FIG. 3 further includes character strings "PUSH" and "D/P-seat" located at the center of graphic object 30. Upon the operator pushing actuator 201 of input unit 20, controller 21 controls display 22 to display the image shown in FIG. 4A on screen 221 of display 22, and controls air conditioner 4 to set the setting temperature at the driver seat and the passenger seat to the setting temperature displayed on screen 221.

Figure 4A:
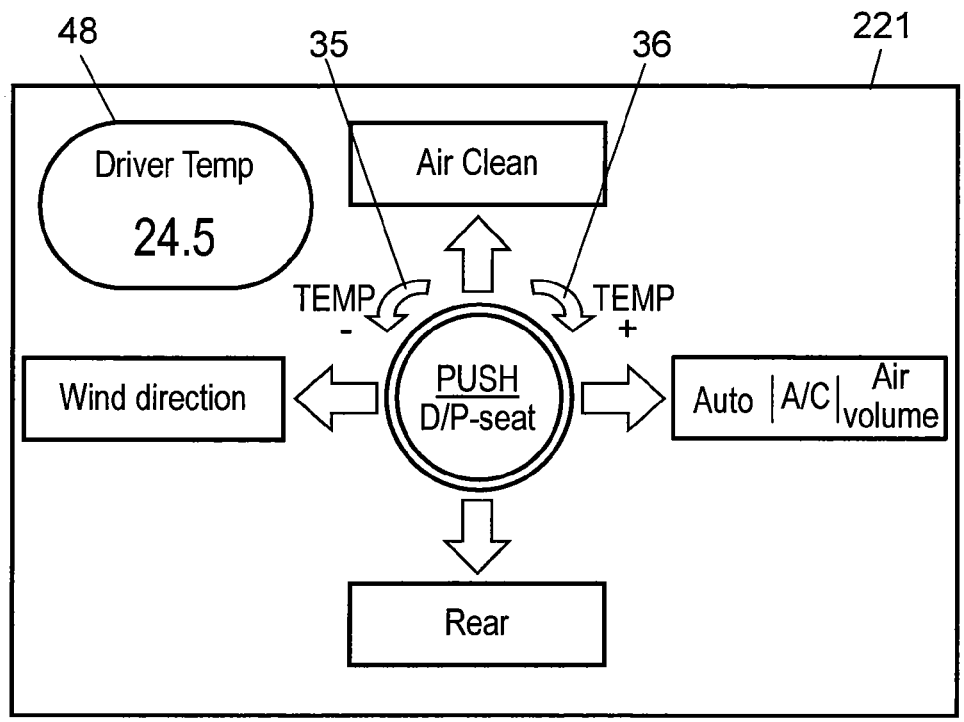
FIGS. 4A and 4B illustrate images displayed on the screen of the input system in accordance with the embodiment.

The image shown in FIG. 4A displays the setting temperature for the driver seat and the passenger seat, and includes sub-function indicator 48 located at upper left and including character strings "Driver Temp" and "24.5". Sub-function indicator 48 indicates the setting temperature of 24.5° C. at the driver seat.

Upon the operator rotating actuator 201 of input unit 20 in a counterclockwise direction corresponding to counterclockwise arrow 35 while screen 221 displays the image shown in FIG. 4A, controller 21 outputs display signal S12 to display 22 in response to operation signal S11 from input unit 20, and additionally outputs control signal S15 to control air conditioner 4 to lower the setting temperature from 24.5° C. to 21.5° C. Upon receiving display signal S21, display 22 displays image shown in FIG. 4B on screen 221. Sub-function indicator 48 in the image shown in FIG. 4B indicates that the temperature is lowered to 21.5° C.

Figure 4B:
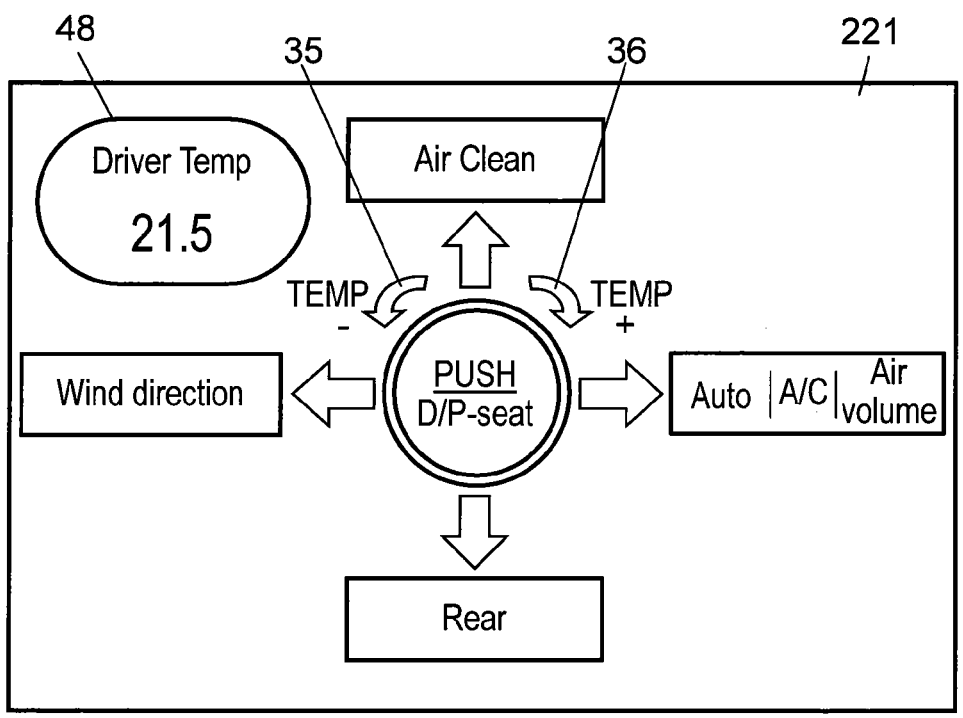
Figure 5A:
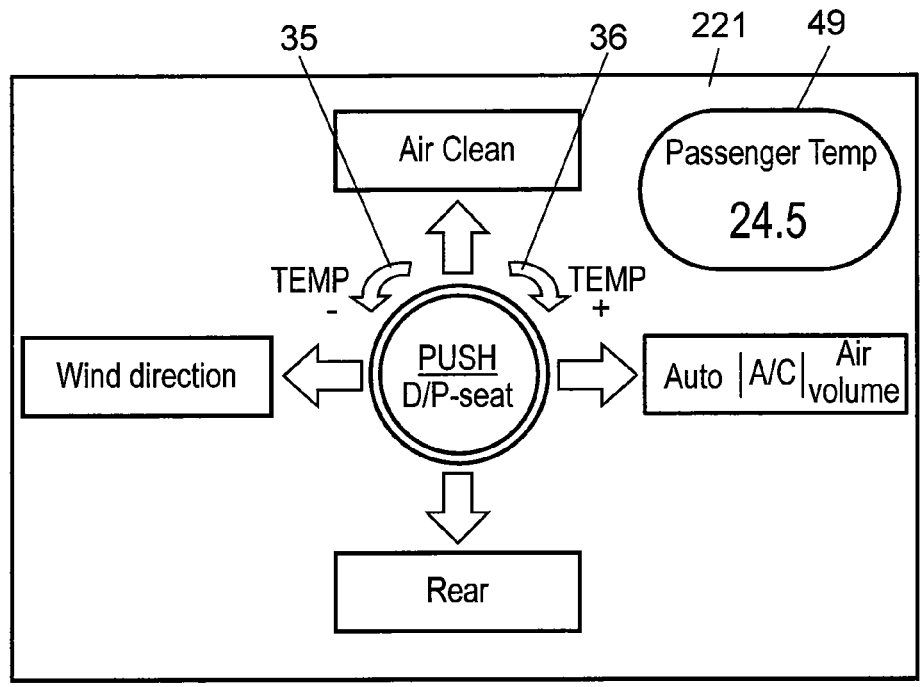
FIGS. 5A and 5B illustrate images displayed on the screen of the input system in accordance with the embodiment.

Upon the operator pushing actuator 201 while screen 221 displays the image shown in FIG. 4B, controller 21 erases sub-function indicator 48 from the image and displays an image shown in FIG. 5A instead. The image shown in FIG. 5A includes sub-function indicator 49 of character strings, "Passenger Temp" and "24.5" located at upper left. Sub-function indicator 49 shown in FIG. 5A indicates that the setting temperature for the passenger seat is 24.5° C.

Upon the operator rotating actuator 201 of input unit 20 in a clockwise direction corresponding to clockwise arrow 36 while screen 221 displays the image shown in FIG. 5A, controller 21 outputs display signal S12 to display 22 in response to operation signal S11 from input unit 20, and additionally outputs control signal S15 to control air conditioner 4 to raise the setting temperature for the passenger seat from 24.5° C. to 27.5° C. Display 22 displays image shown in FIG. 5B on screen 221. Sub-function indicator 49 located at upper right in the image shown in FIG. 4B displays a character string "27.5" and indicates that the setting temperature for the passenger seat is 27.5° C.

Upon the operator tilting actuator 201 of input unit 20 in a forward direction corresponding to upwards arrow 31, controller 21 selects function indicator 43 out of function indicators 43 to 46 directed by upwards arrow 31. Upon the operator tilting actuator 201 in a backward direction corresponding to downwards arrow 33, controller selects function indicator 45 out of function indicators 43 to 46 directed by downwards arrow 33. Similarly, upon the operator tilting actuator 201 to a leftward direction and a rightward direction corresponding to leftwards arrow 32 and rightwards arrow 34, controller 21 selects function indicator 44 and function indicator 46 out of function indicators 43 to 46 directed by leftwards arrow 32 and rightwards arrow 34, respectively.

Figure 5B:
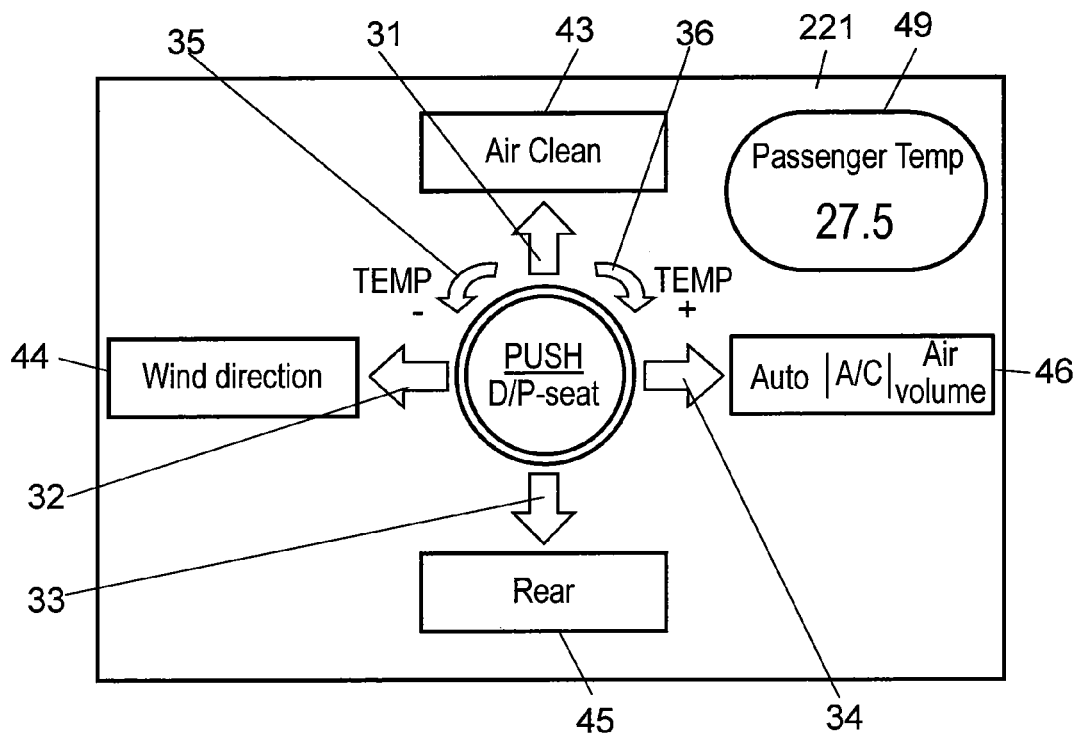
Figure 6:
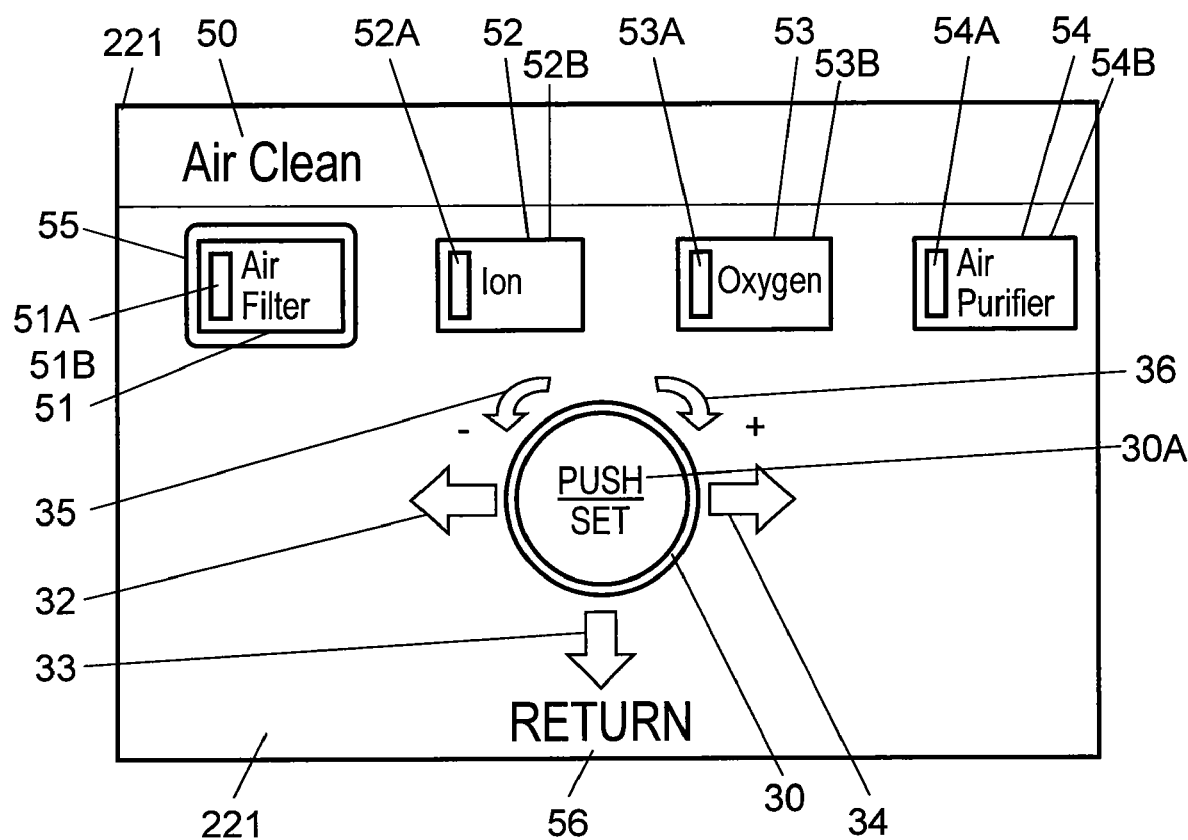
FIG. 6 illustrates an image displayed on the screen of the input system in accordance with the embodiment.

Upon the operator tilting actuator 201 of input unit 20 in the forward direction corresponding to upwards arrow 31 while screen 221 displays the image shown in FIG. 5B, controller 21 selects function indicator 43 out of function indicators 43 to 46 which relates to air cleaning and directed by upwards arrow 31, and controls display 22 to display an image shown in FIG. 6 on screen 221.

The image shown in FIG. 6 includes character string 50, "Air Clean", located at upper left on screen 221. Character string 50 indicates that the image shown in FIG. 6 relates to air cleaning.

The image shown in FIG. 6 includes graphic object 30 located substantially at the center of screen 221, character string 30A, "PUSH/SET", located at the center of graphic object 30, rightwards arrow 34, downwards arrow 33, leftwards arrow 32, and character string 56, "RETURN" located below downwards arrow 33. The image shown in FIG. 6 further includes clockwise arrow 36 located at upper right of graphic object 30, counterclockwise arrow 35 located at upper left of graphic object 30, a character string, "+", located near the head of clockwise arrow 36, and a character string, "−", near the head of counterclockwise arrow 35.

The image shown in FIG. 6 further includes function indicators 51 to 54 located between character string 50 and graphic object 30. Function indicator 51 is located at the left end of screen 221. Function indicator 52 is located at the right of function indicator 51. Function indicator 53 is located at the right of function indicator 52. Function indicator 54 is located at the right of function indicator 53 and at the right end of screen 221. Function indicator 51 includes a character string "Air Filter" relating to a function to blow air into the car cabin through an air cleaning filter. Function indicator 52 includes a character string, "Ion", relating to a function to add negative ions in the air blown into the car cabin. Function indicator 53 includes a character string, "Oxygen", relating to a function to add oxygen in the air blown into the car cabin. A character string, "Air Purifier", included in function indicator 54 relates to an air purifying function for the car cabin.

Function indicators 51 to 54 include outer frames 51B to 54B, and rectangular indicators 51A to 54A located inside outer frames 51B to 54B, respectively. The colors of indicators 51A to 54A indicate whether function indicators 51 to 54 are selected or not, respectively. Indicators 51A to 54A having white color indicates that function indicators 51 to 54 are not selected, respectively. Indicators 51A to 54A having red color which is color other than white color indicate that function indicators 51 to 54 are selected, respectively.

Selection frame 55 having substantially a rectangular shape shows the function indicator selected from function indicators 51 to 54. In the image shown in FIG. 6, for instance, selection frame 55 surrounds function indicator 51, thus indicating that function indicator 51 is selected.

Upon the operator tilting actuator 201 of input unit 20 in a rightward direction corresponding to rightwards arrow 34 or rotating actuator 201 in a clockwise direction corresponding to clockwise arrow 36 while screen 221 displays the image shown in FIG. 6, controller 21 shifts selection frame 55 from function indicators 51 to 54 sequentially in the rightward direction, so that selection frame 55 surrounds each of function indicators 51 to 54 sequentially. Upon the operator operating actuator 221 to shift selection frame 55 in the rightward direction, display 22 displays an image shown in FIG. 7A on screen 221. In the image shown in FIG. 7A, selection frame 55 surrounds function indicator 54.

Figure 7A:
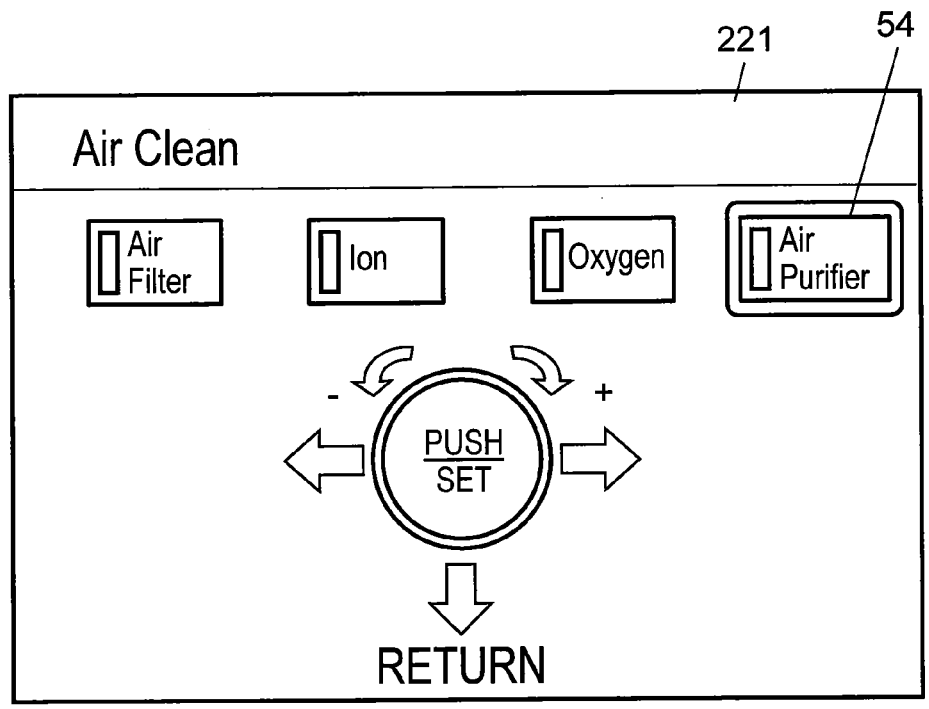
FIGS. 7A and 7B illustrate images displayed on the screen of the input system in accordance with the embodiment.
Figure 7B:
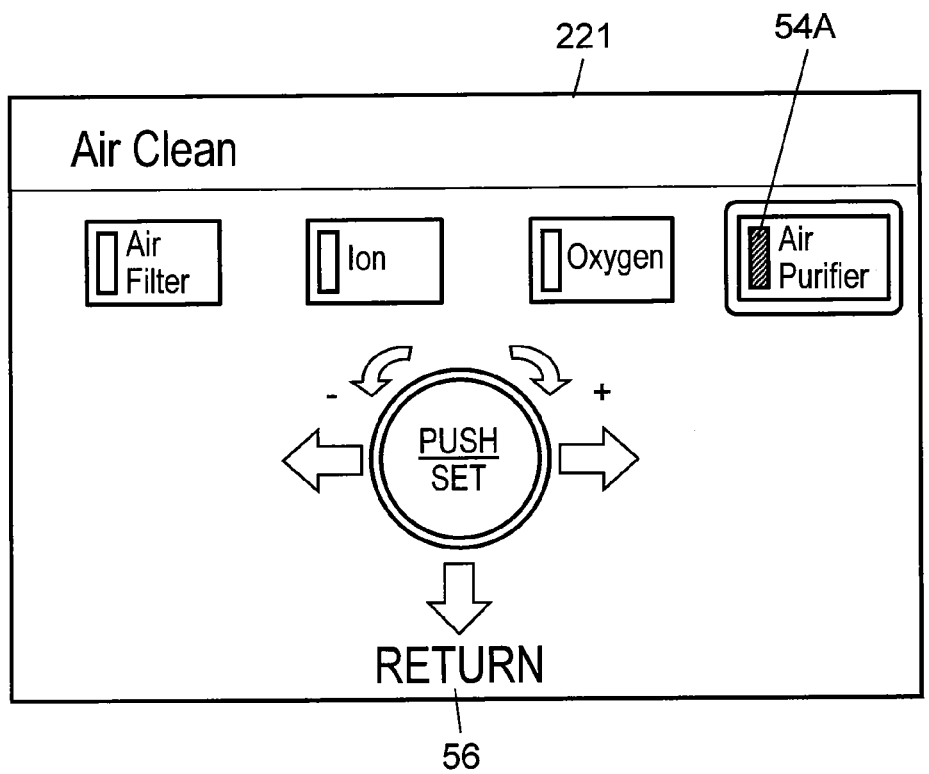
Figure 8:
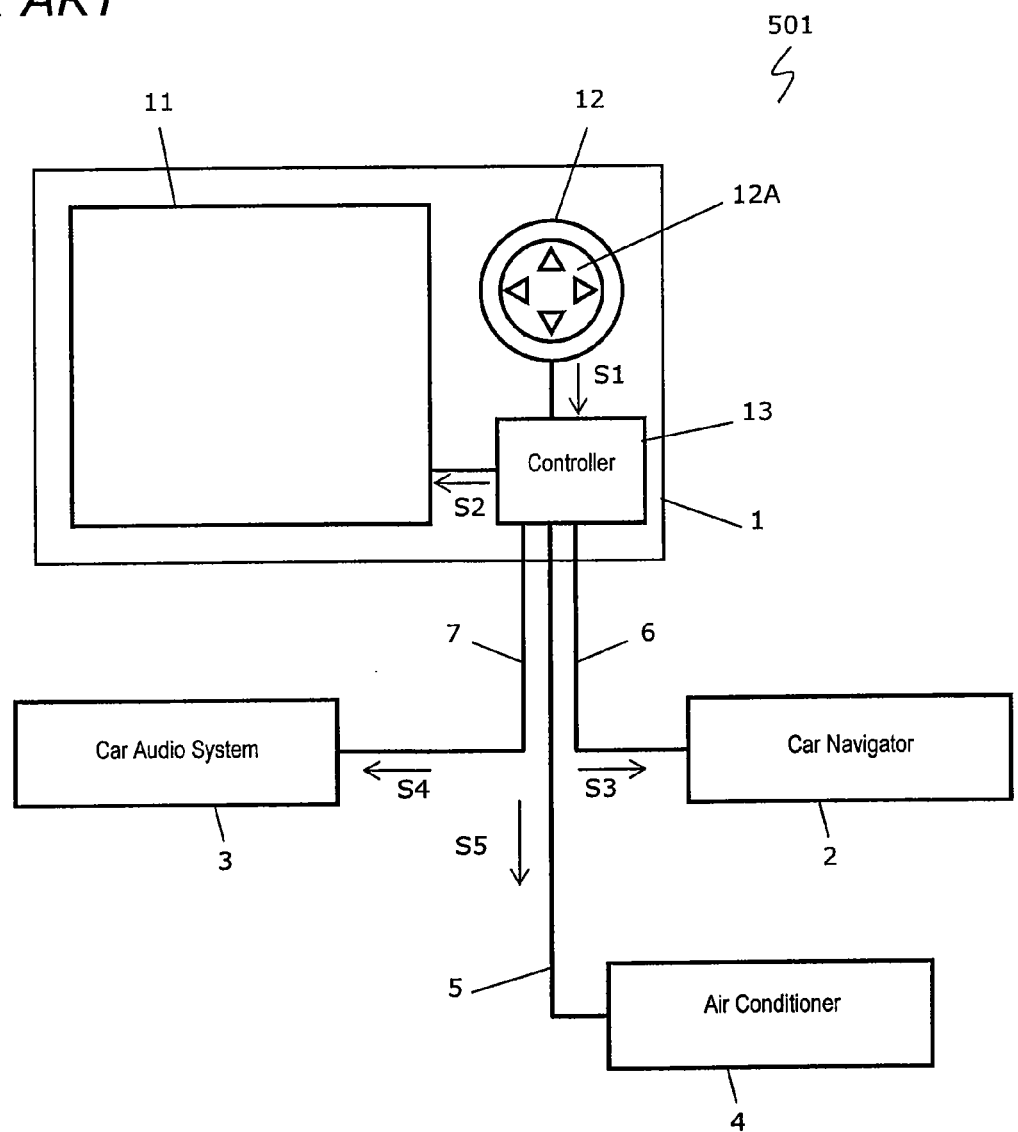
FIG. 8 is a schematic view of a conventional input system for vehicle.
Figure 9:
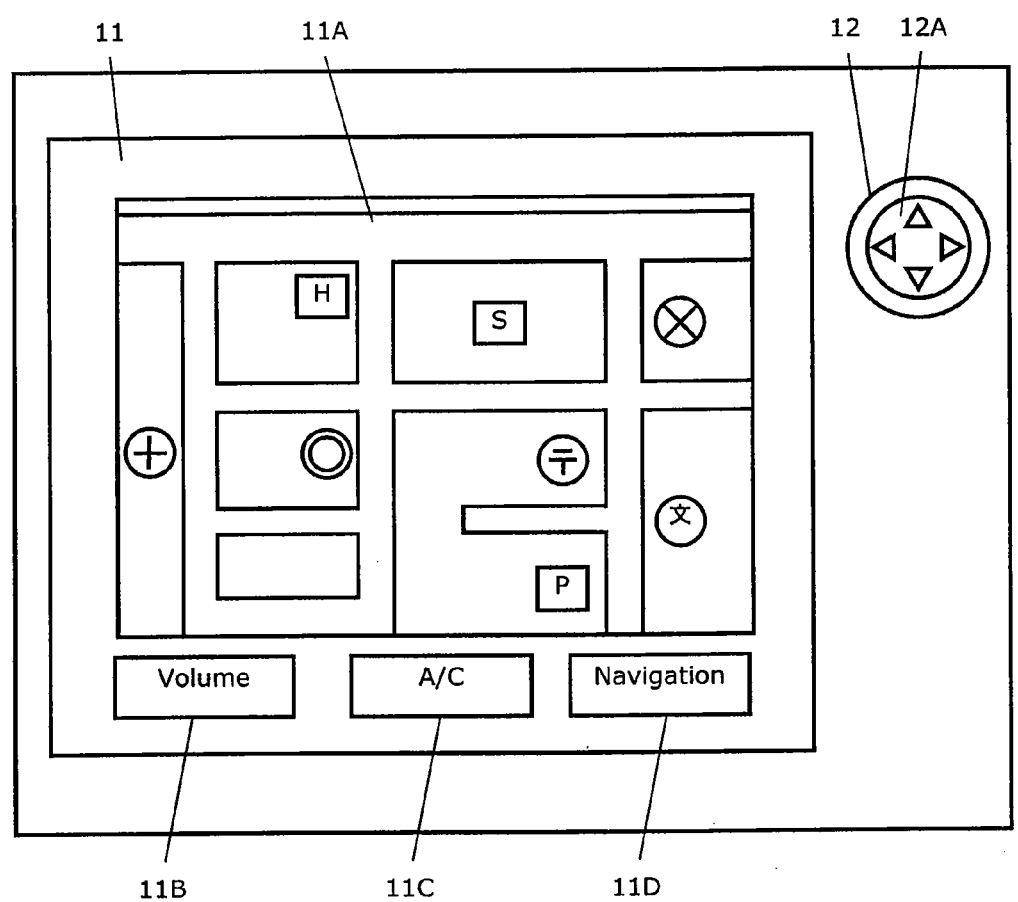
FIG. 9 illustrates an image displayed on a screen of the conventional input system.

Upon the operator pushing actuator 201 of input unit 20 while display 22 displays the image shown in FIG. 7A, controller 21 outputs display signal S12 to display 22 to display an image shown in FIG. 7B on the screen. In the image shown in FIG. 7B, display 22 changes the color of indicator 54A of function indicator 54 from the white color to a color, such as red color, other than the white color to indicate that the function denoted by the character string, "Air Purifier" is selected.

Upon the operator tilting actuator 201 in a backward direction corresponding to downwards arrow 33 while the image shown in FIG. 7B is displayed on screen 221, controller 21 displays the image shown in FIG. 3 on screen 221 according to the character string, "RETURN", of function indicator 56.

Upon the operator pushing push button 202 of input unit 20 instead of tilting actuator 201 of input unit 20 in the backward direction while the image shown in FIG. 7B is displayed on screen 221, controller 21 displays the initial image shown in FIG. 2 on screen 221 of display 22.

As described above, graphic object 30 of actuator 201 of input unit 20 suggests actuator 201 to the operator. Upon just looking at arrows 31 to 36 located around graphic object 30 and the function indicators located outside arrows 31 to 36, the operator can intuitively recognize the operation directions in which the operator moves, tilts, and rotates actuator 201, and the performed functions when actuator 201 is operated in the directions, so that the operator can operate input system 1001 for vehicle reliably.

That is, controller 21 outputs display signal S12 in response to the operation on actuator 201 and outputs control signal S15 to air conditioner 4, the target device, that performs one or more functions. For example, the image shown in FIG. 3 includes graphic object 30 indicating actuator 201, one or more arrows 31 to 34 located around graphic object 30, and one or more function indicators 43 to 46 located in the directions indicated by one or more arrows 31 to 36, respectively.

Upon the operator operating actuator 201 in a direction corresponding to a direction indicated by an arrow, e.g. arrow 31, out of one or more arrows 31 to 36, controller 21 selects function indicator 43 out of one or more function indicators 43 to 46 located in the direction indicated by arrow 31. Controller 21 controls air conditioner 4, the target device, so as to perform a function out of one or more functions indicated by the selected function indicator 43.

Graphic object 30 indicating actuator 201 of input unit 20 to suggest actuator 201 to the operator has a circular shape, but may have any shape, such as a polygonal shape or a solid shape of actuator 201, other than the circular shape as long as the shape suggests actuator 201 to the operator.

Input unit 20, controller 21, and display 22 are accommodated in different cases, and are mounted to different positions individually. However, input unit 20 and controller 21 can be accommodated in a single case. Or controller 21 and display 22 can be accommodated in a single case. Additionally, input unit 20, controller 21, and display 22 can be accommodated together in a single case.

What is claimed is:

1. An input system for a vehicle, comprising:
   an actuator operable by an operator;
   a controller outputting a display signal in response to an operation on the actuator, and outputting a control signal to a target device that performs one or more functions; and
   a display having a screen to display an image based on the display signals, wherein
   the image including
      a graphic object indicating the actuator,
      one or more arrows and one or more function indicators located around the graphic object,
      each of the one or more arrows pointing away from the graphic object and pointing directly toward a respective one of the function indicators,
      each of the function indicators indicating a respective one of the functions, and
   the controller operable to
      upon the operator operating the actuator in the direction corresponding to one of the one or more arrows, select one of the one or more function indicators located in a direction indicated by one of the one or more arrows, and
      control the target device to perform a function out of the one or more functions indicated by the selected one or more function indicators.

2. The input system for the vehicle according to claim 1, wherein
   the input system is adapted to be installed in the vehicle, and
   the actuator is located at a position operable by the operator sitting on a driver seat of the vehicle.

3. An input system for a vehicle, comprising:
   an actuator operable by an operator;
   a controller outputting a display signal in response to an operation on the actuator, and outputting a control signal to a target device that performs a plurality of functions; and
   a display having a screen to display an image based on the display signals, wherein
   the image including
      a graphic object indicating the actuator,
      a plurality of arrows and a plurality of function indicators located around the graphic object,
      each of the plurality of arrows pointing away from the graphic object and pointing directly toward a respective one of the plurality of function indicators,
      each of the plurality of function indicators indicating a respective one of the plurality of functions, and
   the controller operable to
      upon the operator operating the actuator in the direction corresponding to one of the plurality of arrows, select one of the plurality of function indicators located in a direction indicated by one of the plurality of arrows, and
      control the target device to perform a function out of the plurality of functions indicated by the selected plurality of function indicators.

4. The input system for the vehicle according to claim 3, wherein
   the input system is adapted to be installed in the vehicle, and
   the actuator is located at a position operable by the operator sitting on a driver seat of the vehicle.

* * * * *